United States Patent Office 3,785,995
Patented Jan. 15, 1974

3,785,995
ANTIOZONANT-ANTIOXIDANT COMPOSITION CONTAINING SECONDARY AMINE AND HYDROUS CALCIUM SILICATE
James Kalil, Wilmington, Del., assignor to E. I. du Pont de Nemours and Company, Wilmington, Del.
No Drawing. Filed Mar. 2, 1972, Ser. No. 231,365
Int. Cl. C08d 11/04
U.S. Cl. 252—400 R         8 Claims

ABSTRACT OF THE DISCLOSURE

An antiozonant-antioxidant composition which is crystalline and readily dispersible in elastomeric polymers comprising a mixture of, by weight, 94–86% secondary amine, said amine containing 30–65% diaryl-p-phenylenediamine and 70–35% N-phenyl-2-naphthylamine, and 6–14% hydrous calcium silicate and process for making the same.

BACKGROUND OF THE INVENTION

This invention relates to a novel antiozonant-antioxidant and a process for its preparation.

Antiozonants have been used with elastomeric polymers to increase the resistance of the vulcanizates to atmospheric ozone. An especially effective antiozonant for chloroprene polymers is prepared by condensing hydroquinone with an amine mixture of o-toluidine and mixed xylidines, as described more fully in Pat. 3,513,124. The resulting diaryl-p-phenylenediamine prepared as described in the above referred to patent is a solid having good solubility in chloroprene polymers and is particularly outstanding in the excellent bin storage stability exhibited by chloroprene polymers which have been compounded with this particular diaryl-p-phenylenediamine.

For certain uses it is desirable to have an antiozonant-antioxidant that is readily dispersible in elastomeric polymers at low temperatures, without loss of the beneficial properties associated with polymers compounded with the type antiozonant referred to hereinabove. It is important for many uses to have antiozonant-antioxidants that are readily dispersible in polymers at low temperatures, e.g., about 70° to 85° C. For example, in the preparation of covered wire by the extrusion of the compounded polymer over the wire, rapid curing must follow. This requires a fast-acting accelerator system and, therefore, the compounding step, that is, the mixing of the polymer with the compounding ingredients, must be carried out at relatively low temperatures in order to prevent premature vulcanization. Further, the antiozonant-antioxidant should be in a physical form that can be readily handled in rubber processing procedures and should retain the desired particulate form with little or no tendency to massing during storage and dustiness during handling.

SUMMARY OF THE INVENTION

A novel antiozonant-antioxidant composition has been discovered that is crystalline, and readily dispersible in elastomeric polymers even at low temperatures, e.g., 70–85° C., and can be handled with ease in rubber processing procedures which comprises a composition containing (A) from about 94–86%, by weight, based on the weight of the total composition, of a secondary amine, said amine containing (a) from about 30–65%, by weight, of a diaryl-p-phenylenediamine prepared by condensing hydroquinone with an amine mixture comprising about 75–90%, by weight, o-toluidine and about 25–10%, by weight, mixed xylidines, and (b) from about 70–35%, by weight, N-phenyl-2-naphthylamine, and (B) from about 6–14%, by weight, based on the weight of the total composition, of hydrous calcium silicate. The antiozonant-antioxidant of the present invention is prepared by mixing said secondary amines in the molten state and calcium silicate in the amounts disclosed above so as to uniformly incorporate hydrous calcium silicate into the molten amines. The composition functions as an effective combined antiozonant and antioxidant when incorporated in elastomers, especially chloroprene and butadiene-styrene elastomers.

DETAILED DESCRIPTION OF THE INVENTION

The diaryl-p-phenylenediamine with which the calcium silicate is mixed is the condensation product of one mole of hydroquinone with at least about 2 moles of an amine mixture containing about 75–90%, by weight, o-toluidine and about 25–10%, by weight, of an alkylphenylamine composition comprising ring substituted dimethylanilines or mixtures of dimethyl- and ethylanilines. Any proportion of the dimethyl- or ethylanilines can be used so long as at least 65% by weight of the composition is at least one xylidine. Any one or combination of more than one of the xylidine isomers can be used to make up the required amount. Particularly preferred alkylphenylamine compositions are those sold commercially as mixed xylidines by various chemical suppliers. These compositions consist essentially of differing proportions of xylidine isomers, ethylaniline, and minor quantities of other alkylphenylamines. They are prepared by nitration and subsequent reduction of technical xylene. They have a specific gravity of 0.97–1.00 and a boiling range at atmospheric pressure of about 200–230° C. The condensation product of these amines and hydroquinones is thus a complex mixture of diaryl-p-phenylenediamines referred to herein simply as "diaryl-p-phenylenediamine."

While more than two moles of the amine mixture can be used in carrying out the condensation, there is little practical advantage to be gained in the use of more than a minor excess of amine. Use of a large excess makes it necessary to remove and, preferably, to recover the excess amine. In practice, it has been found advantageous to use a 10–20% excess of amine. Any of the well-known condensation catalysts can be used, such as metal halides, phosphoric acid, sulfuric acid, and toluene-sulfonic acid. The preferred catalyst is a mixture of aluminum chloride and ferric chloride. The temperature of the reaction ranges between 175° C. and 325° C., preferably between 200 and 260° C. The reaction is complete when no more water is evolved. Usually, a heating period of 8 to 24 hours, suffices, although the reaction time will depend on the temperature. Unreacted amine is separated from the reactants by distillation.

The second component of the secondary amine mixture is N-phenyl-2-naphthylamine. At least 35%, based on the amount of secondary amine, is N-phenyl-2-naphthylamine. Such an amount is necessary in order to obtain a mixture having the desired rapidity of crystallization. On the other hand, generally no more than about 70% of the amine mixture is N-phenyl-2-naphthylamine in order to obtain a mixture having the desired melting point. Preferably, the preferred proportions of the two secondary amine ingredients range from about 40–60% N-phenyl-2-naphthylamine and the balance, i.e., 60–40%, of the particular diaryl-p-phenylenediamine.

Usually, at least about 6%, based on the weight of the entire composition, is calcium silicate. This amount is needed in order to obtain the desired rapidity of crystallization. Generally, the antiozonant composition does not contain more than about 14%, based on the weight of the entire composition, of calcium silicate. Larger amounts of calcium silicate result in mixtures having excessively high viscosity and, therefore, they cannot be conveniently mixed and handled in rubber processing procedures. Preferably, the amount of calcium silicate used in the composition is from about 8–12%, by weight, based on the weight of the entire composition. Any hydrous calcium silicate can be used in the composition. Representative hydrous calcium silicate include those containing about 49–65%, by weight, silica ($SiO_2$), 19–28%, by weight, lime (CaO), and the remainder being water and small quantities of alumina ($Al_2O_3$), iron oxide ($Fe_2O_3$), magnesia (MgO), and alkalies ($Na_2O+K_2O$) in varying amounts. The preferred calcium silicates are available commercially under the trade names "Micro-Cel" manufactured by Johns-Manville and "Silene" manufactured by PPG Industries, Inc. Generally, the surface area of the silicates is about 80–200 square meters per gram.

The calcium silicate can be added to the amine mixture at any time prior to solidification. The calcium silicate can be mixed with one or both of the secondary amines prior to melting said amines or it can be added to one or both of the amines in the molten state. It is important both that the molten amines be thoroughly mixed and the calcium silicate be distributed throughout the molten material. Preferably, the calcium silicate is added to the mixture of molten amines; the amine mixture of the present invention has a melting point, as determined by Fisher-Johns melting point apparatus, of about 79–85° C.

The antiozonant-antioxidant composition of this invention can be solidified by cooling. Any conventional cooling method can be used. However, the composition is especially adaptable, because of its relative rapidity of crystallization, to being converted directly into a desirable physical form by introduction into a crystallizer-type apparatus. The preferred apparatus contains an agitated bed of previously solidified material in a twin screw conveyor mixer in which tubular screws and jacketed trough provide means for efficient heat transfer to remove sensible heat and heat of crystallization. A representative apparatus used in crystallizing the antiozonant-antioxidant is disclosed in Pat. 2,610,033 manufactured by the Rietz Manufacturing Co. and marketed under the name "Thermascrew."

The antiozonant-antioxidant composition of this invention can be converted directly to hard pellets having sizes varying from about ⅟₁₆ to ¾ of an inch in diameter (preferably ¼ to ½ inch). The pelletized product is non-dusting and non-massing without the addition of anti-dusting and anti-massing additives so often required in dry compounding ingredients for rubber. The product is easy to handle and disperses readily in elastomers at relatively low temperatures (70–85° C.).

The product of this invention can be used advantageously in any elastomer for any application in which a secondary amine antioxidant or antiozonant is suitable. For example, the product may be used as described in U.S. Pat. 3,513,124. The product of the present invention can be used to provide the antiozonant and part or all of the additional antioxidant activity, depending on the degree of protection desired.

The product of this invention is also an effective antiozonant-antioxidant for butadiene-styrene copolymers (SBR) and for natural rubber. It shows excellent solubility in the elastomers so that the vulcanizates are non-blooming.

The following examples are given to illustrate the invention in detail but are not to be considered limiting the teaching of the invention.

Example 1

The process is carried out in a steam-jacketed steel kettle equipped with agitator and bottom outlet. The steam pressure in the jacket is about 60 p.s.i.g. To the kettle are charged 1419 lbs. (44%) of the diaryl-p-phenylenediamine prepared by reacting 20% mixed xylidines and 80% o-toluidine with hydroquinone in the presence of aluminum chloride, and 1419 lbs. (44%) of p-phenyl-2-naphthylamine while maintaining an atmosphere of nitrogen in the vessel. The mixture is heated to about 135° C. until entirely molten. Agitation is begun as soon as the charge has melted enough to allow agitation without splashing. When the charge is completely molten, 387 lbs. (12%) of hydrated calcium silicate having an average particle size of 2.1 microns and a surface area of 95 square meters per gram, and identified as Micro-Cel E, are added gradually. After stirring for one hour to ensure a uniform blending, the mixture is fed by nitrogen pressure through steam-jacketed transfer lines maintained at 120–130° C. to a "Thermascrew" apparatus (Rietz Manufacturing Company) containing a seed of already solidified material. The "Thermascrew" apparatus used is a double-screw device (operating essentially as described in FIGS. 6 and 7 of U.S. 2,610,033). The hollow screw and jacketed trough are brine-cooled. The seed bed is maintained at 20–50° C. The product issuing from the "Thermascrew" is screened to remove all particles above about 0.5 inch in size. The product is in the form of brownish-to-grey pellets. The melting point is 80–85° C.

As a test to determine crystallization time, the following procedure is carried out. A total of 9–10 grams of a mixture of the composition is prepared by adding the solid ingredients to a test tube and heating to about 120° C. The molten contents are then stirred and allowed to cool. When the temperature reaches about 90° C. the material in the test tube is poured into an aluminum cup. Mixing is continued until the mixture solidifies. The time from pouring until the composition becomes a non-tacky solid is the crystallization time. Crystallization time of the sample should be one minute or less if the mixture is to solidify rapidly enough so that it can be recrystallized in an apparatus such as the herein-described "Thermascrew" apparatus.

The table shows the crystallization time for various mixtures. The following abbreviations are used:

DAPD=diaryl-p-phenylenediamine (same as above)
NPNA=N-phenyl-2-naphthylamine
Silicate=same calcium silicate used above

TABLE I

| Expt. | Grams | | | Percent silicate | Crystallization time, seconds |
|---|---|---|---|---|---|
| | DAPD | NPNA | Silicate | | |
| A | 4.37 | 4.37 | 1.25 | 12.5 | 21 |
| B | 4.50 | 4.50 | 1.0 | 10 | 34 |
| C | 4.62 | 4.62 | 0.75 | 7.5 | 47 |

Example 2

This experiment is carried out in the same way as described above in Example 1 except that different calcium silicates are used as follows:

(A) A hydrated calcium silicate similar to that used in Example 1 but having an average particle size of 1.6 microns ("Micro-Cel" T-26, Johns-Manville).

(B) Precipitated, hydrated calcium silicate having a surface area of 82–92 square meters per gram, an oil absorption capacity of 80–120%, and an ultimate particle size of 0.030 micron ("Silene" EF, PPG Industries, Inc.).

In each case the mixture contains 4.5 grams of the diaryl-p-phenylenediamine, 4.5 grams of N-phenyl-2-naphthylamine, and 1.0 gram (10%) of the calcium silicate. The table below shows the crystallization time.

Silicate: Crystallization time (secs.)
A ------------------------------------- 35
B ------------------------------------- 45

What is claimed is:
1. An antiozonant-antioxidant composition which is crystalline and readily dispersible in elastomeric polymers comprising a mixture containing, by weight,

(A) from about 94–86% secondary amine, said amine containing (a) from about 30–65% diaryl-p-phenylenediamine prepared by condensing hydroquinone with an amine mixture comprising about 75–90% o-toluidine and about 25–10% mixed xylidines, and (b) from about 70–35% N-phenyl-2-naphthylamine, and (B) from about 6–14% hydrous calcium silicate.

2. The product of claim 1 containing 40–60%, based on the weight of secondary amine, of N-phenyl-2-naphthylamine.

3. The product of claim 2 containing 8–12% hydrous calcium silicate.

4. The product of claim 2 in particulate form.

5. A process for preparing a crystalline antiozonant-antioxidant composition having excellent solubility in elastomers which comprises mixing (A) from about 94–86%, by weight, secondary amines, in a molten state, said amines comprising (a) from about 30–65%, by weight, diaryl-p-phenylenediamine which is prepared by condensing hydroquinone with an amine mixture comprsiing about 75–90%, by weight, o-toluidine and about 25–10%, by weight, of mixed xylidines, and (b) from about 70–35%, by weight, N-phenyl-2-naphthylamine, (B) uniformly incorporating in the molten amines from about 6–14%, by weight, hydrous calcium silicate, and (C) solidifying the composition by cooling to obtain said composition in crystallized form.

6. The process of claim 5 wherein 40–60%, based on the weight of secondary amine, of N-phenyl-2-naphthylamine is added to the mix.

7. The proces of claim 6 wherein 8–12% hydrous calcium silicate is incorporated in the molten amines.

8. The process of claim 5 wherein the material is agitated during step (C).

References Cited

UNITED STATES PATENTS

| 3,304,285 | 2/1967 | Cox | 260—45.9 R |
| 3,513,124 | 5/1970 | Kalil | 260—45.9 R |
| 3,674,705 | 7/1972 | Hytrek | 252—400 R |

FOREIGN PATENTS

| 1,128,388 | 9/1968 | Great Britain. |
| 1,526,506 | 4/1968 | France. |

LEON D. ROSDOL, Primary Examiner

I. GLUCK, Assistant Examiner

U.S. Cl. X.R.

252—182, 384, 401, 428; 260—45.9 R